INVENTORS
A. ANTTI I. SOVIJARVI &
NIILO N. JARONEN

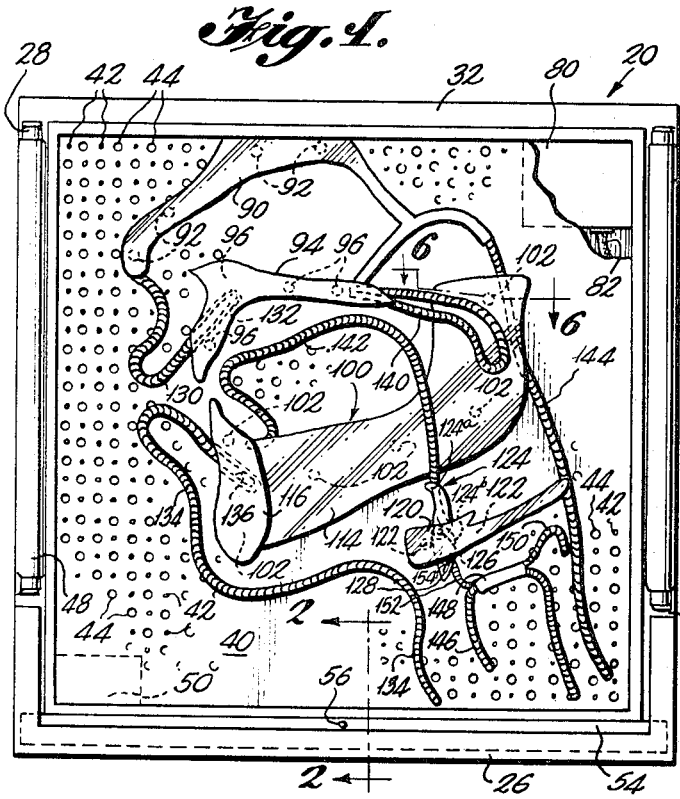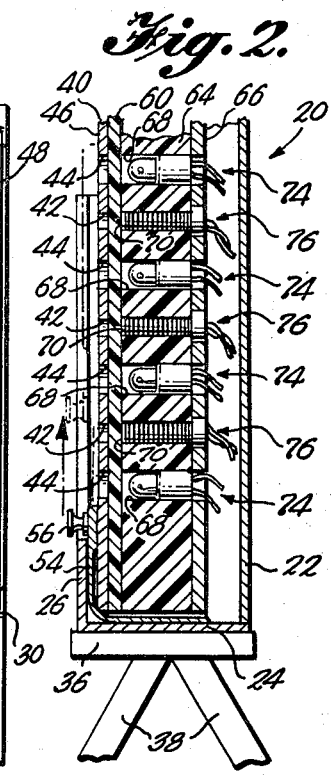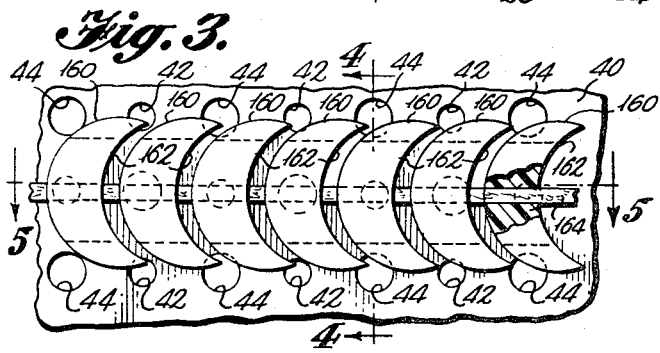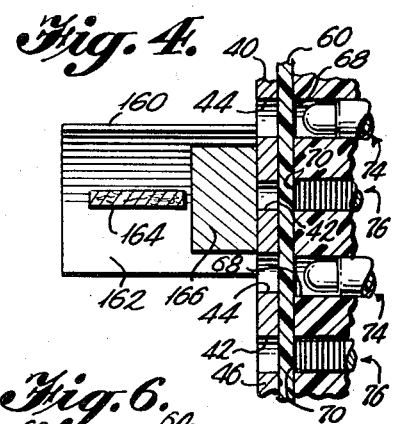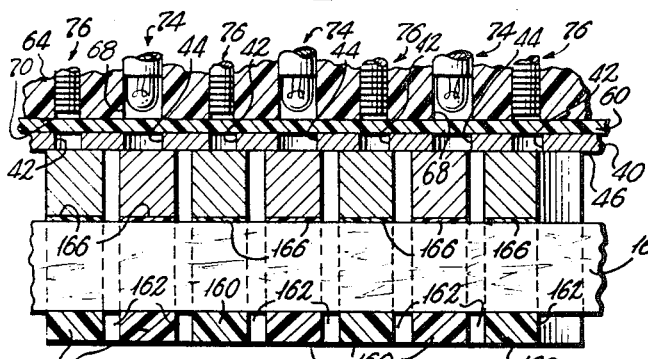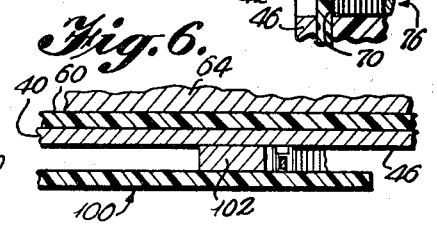
INVENTORS
A. ANTTI I. SOVIJARVI &
NIILO N. JARONEN Nov. 12, 1968  A. A. I. SOVIJARVI ET AL  3,410,003
DISPLAY METHOD AND APPARATUS
Filed March 2, 1966  5 Sheets-Sheet 2
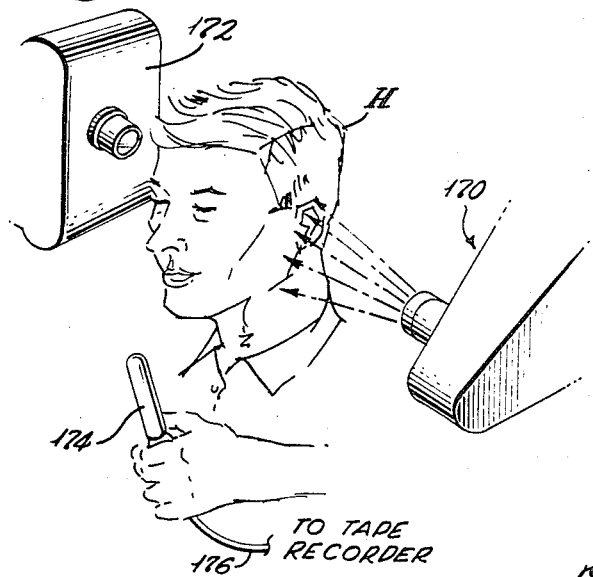
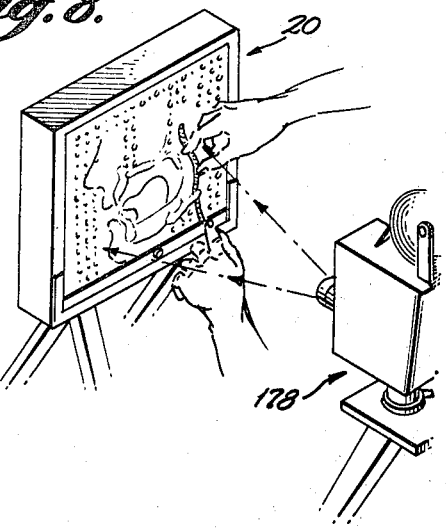
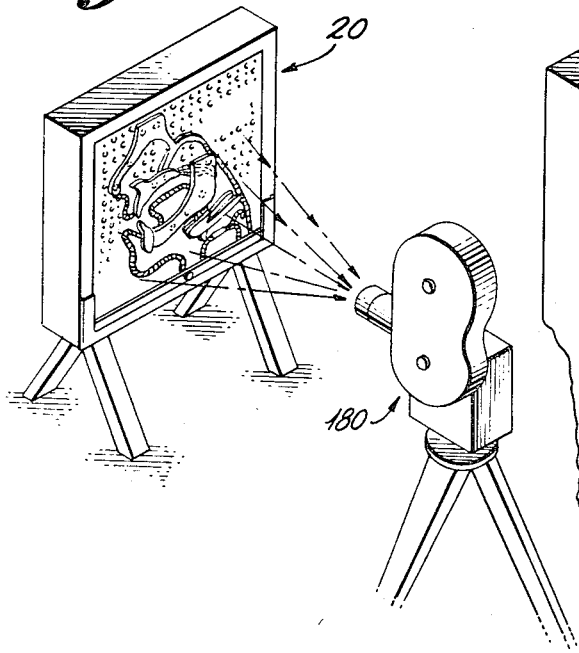
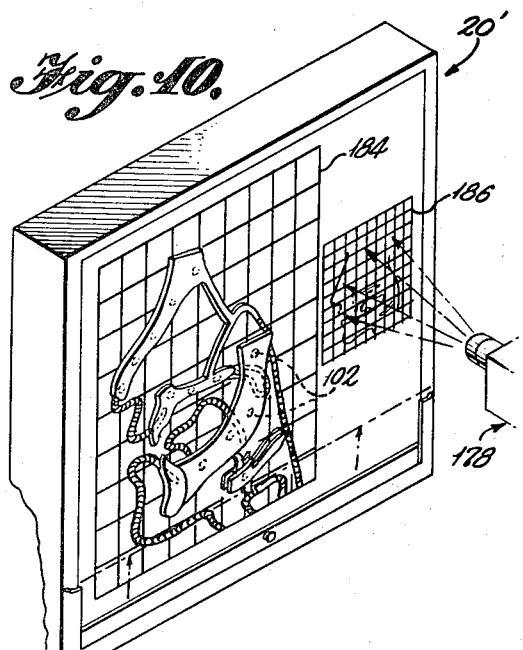
INVENTORS
A. ANTTI I. SOVIJARVI &
NIILO N. JARONEN
BY Shoemaker and Mattare
ATTORNEYS Nov. 12, 1968   A. A. I. SOVIJARVI ET AL   3,410,003
DISPLAY METHOD AND APPARATUS
Filed March 2, 1966                            5 Sheets-Sheet 3
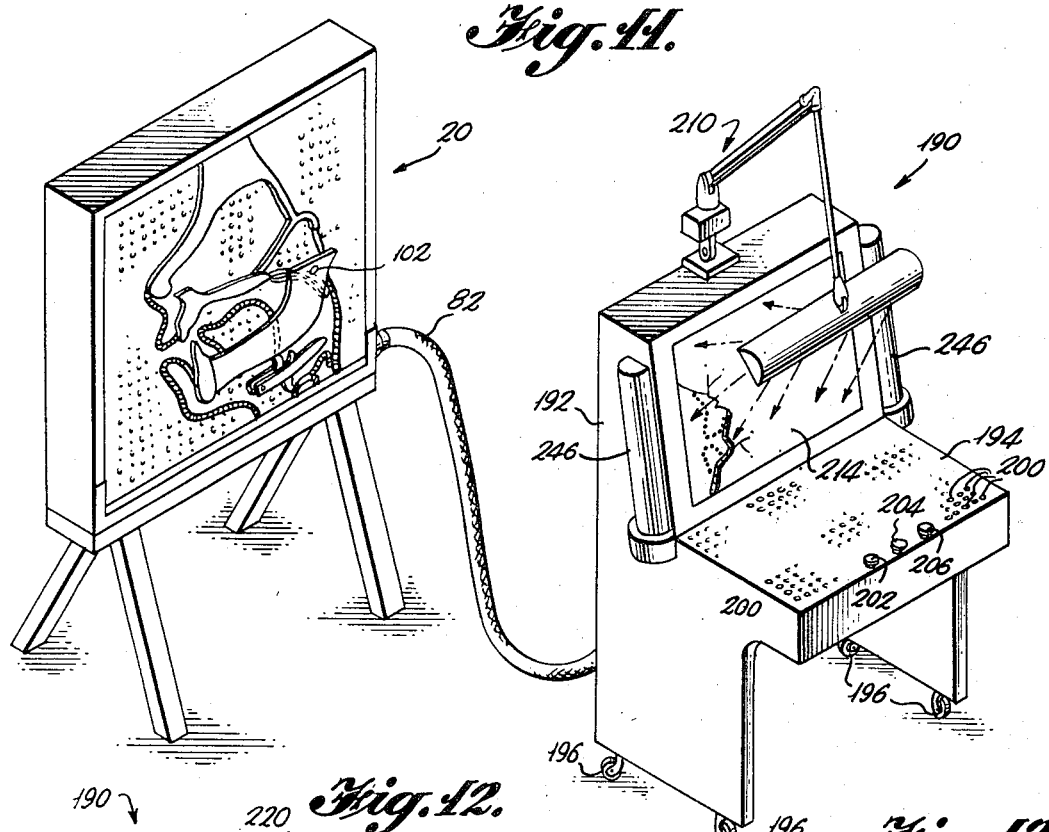
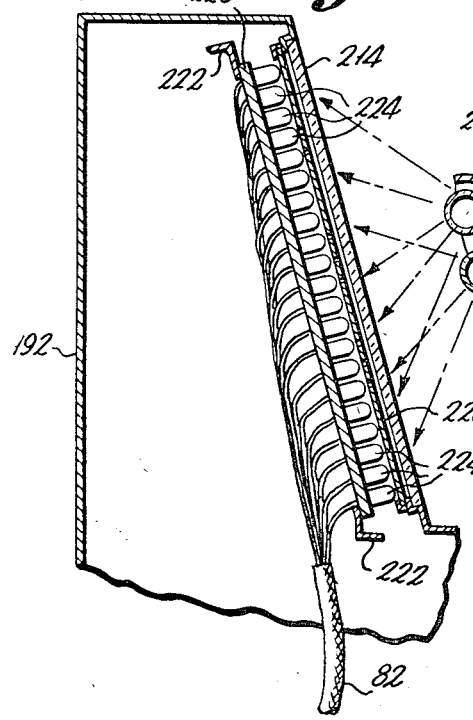
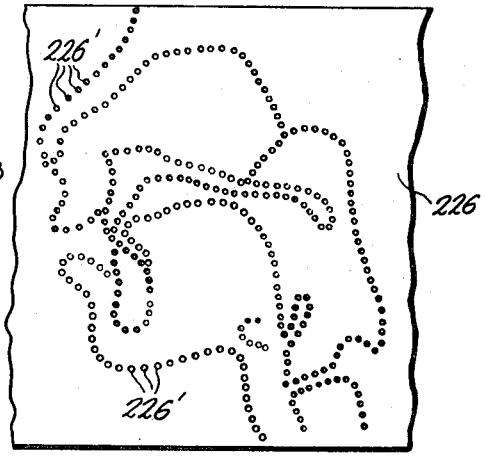
INVENTORS
A. ANTTI I. SOVIJARVI &
NIILO N. JARONEN
BY Shoemaker and Mattare
ATTORNEYS

Nov. 12, 1968  A. A. I. SOVIJARVI ET AL  3,410,003
DISPLAY METHOD AND APPARATUS
Filed March 2, 1966  5 Sheets-Sheet 5

INVENTORS
A. ANTTI I. SOVIJARVI &
NIILO N. JARONEN

BY Shoemaker and Mattare
ATTORNEYS

United States Patent Office 3,410,003
Patented Nov. 12, 1968

3,410,003
DISPLAY METHOD AND APPARATUS
Arvi Antti I. Sovijarvi, Mantytie 17B24, Helsinki, Finland, and Niilo N. Jaronen, Niittykumpu 3E81, Niittykumpu, Finland
Filed Mar. 2, 1966, Ser. No. 531,200
14 Claims. (Cl. 35—53)

ABSTRACT OF THE DISCLOSURE

A flat metallic surface has a plurality of holes formed therethrough and illumination means is disposed adjacent thereto for passing light through the holes. A diffusing means is positioned adjacent the illumination means for diffusing the light. Flexible contour means is supported on the surface and includes permanent magnet means for holding it to the surface. The contour means also includes metallic portions which are attracted toward electromagnet means supported adjacent the surface. The contour means comprises a plurality of similar members interconnected by a flexible connector. Remote control means is also provided for remotely adjusting the position of the indication means.

---

The present invention relates to a new and novel display method and apparatus, and more particularly to a display method and apparatus which is especially adapted to display movements of certain means such as the speech organs employed in human speech.

The arrangement of the present invention is adapted to display different types of means of various configurations either in a stationary position, or in sequential stationary positions or more especially is adapted to display such means in motion.

While the present invention may be employed for displaying movements of different types of means, it is especially and specificaly adapted to display the organs of speech of a human being while speaking. This display may be employed either for research or instructional purposes, and is particularly adapted for the production of movies or picture tapes as used in television.

The apparatus of the present invention provides a very clear and accurate representation, preferably on an enlarged scale, of the positions of certain means of rather complex configuration. For example, as used in phonetic study, the apparatus is adapted to provide a display which simulates the movement of various portions of the human anatomy used in human speech such as the lips, jaws, tongue, and various portions of the pharynx as well as other associated physiological features such as the epiglottis and the like. An important feature of the present invention is that it enables accurate display of these various components in their different interrelationships with respect to one another wherein the shape of certain of the components and their position may change considerably and continuously while speaking. The display means of the present invention is adapted to accurately reproduce the actual movements of corresponding parts of the human body and at similar speeds.

It will be recognized that one of the fundamental problems involved in a display device of this character is to provide display means which is adapted to provide a display of rather complex configuration, and further one which will be capable of adjustment in a rapid manner.

The indication means of the present invention may take two different forms. Firstly, the indication means may comprise contour means, and such contour means may comprise both rigid portions and flexible portions, such flexible portions corresponding to those portions of the speech organs which have a relatively high degree of movement during the speech process. Means in the form of permanent magnets or the like are provided for retaining the flexible contour means in position on a display surface, and electromagnet means and the like is associated with the display surface for controlling the movement of the contour means. This electromagnetic control means is adapted to be remotely controlled, and such remote control may be carried out either by hand or automatically. It should also be noted that the position of the contour means may be manually controlled simply by physically grasping the contour means and adjusting its position as required.

The automatic remote control feature of the present invention includes photosensitive resistor means, and suitable means may be employed for controlling the amount of light falling on the photosensitive resistor means so as to automatically operate the indication means in accordance with the desired movements or positions.

The contour means of the present invention is of a novel construction so as to enable it to readily assume different shapes and also such that it can quickly move from one configuration to another.

The indication means of the present invention may also include illumination means. The display surface of the invention is provided with a plurality of holes through which light from the illumination means is adapted to pass, a suitable light diffuser means being interposed between the illumination means and the display area. The illumination means may be controlled so as to define the same general outlines as are defined by the contour means previously discussed. Different colored illumination means may also be employed for obtaining different effects.

The illumination means and the contour means may also be used in conjunction with one another or separately as desired. When used concurrently, the illumination means may be employed as well as the contour means for illustrating the general outline of the configuration, or in the case of indicating certain movements of the speech organs, the contour means may be employed for defining the outlines of different organs while the illumination means may be utilized for indicating the air passages between such speech organs. It will accordingly be apparent that the two different indication means of the present invention may be utilized independently of one another or in cooperation with one another to obtain a number of different unique effects.

When utilizing the apparatus of the present invention for speech instruction, the teacher may employ the separate remote control means without the necessity of remaining at the display area and further without necessity of manually moving the contour means itself. On the other hand, the student may remain at the display surface area to manipulate the contour means while the teacher supervises his work and makes suggestions for correction from the remote control means.

The remote control system of the present invention is adapted to be operated either from program means such as punched cards or punched tape or it may be operated by projecting an image on the photosensitive resistor means thereof as hereinafter explained.

The present invention contemplates a method of preparing clear and accurate films, which may be in color, of movements of the speech organs, these movements being indicated either by illuminated outlines, or by the contour means or by a combination of the illumination and contour means. Additionally, as mentioned above, the apparatus of the present invention is adapted to produce a display automatically on the display surface of the apparatus in accordance with pre-recorded data which may be on an X-ray film, for example, on a punched card or on a punched tape and the like. Either means of display may be employed for teaching purposes with beneficial results. The teaching can be carried out more quickly than with conventional methods now in use such as making a movie only of the exterior lips of a speaker, or by making numerous drawings and color slides or pictures, many of which do not accurately portray the actual movements of the speech organs.

Additionally, the present invention is adapted to provide a better visual presentation of such movement, and on a much larger scale. This results in increased interest and comprehension by the pupil. Additionally, when teaching speech movements, the present invention is adapted to show all of the movements of the speech organs including transitional stages between sounds which enables the study and teaching of local and partial phenomena in the movements of the organs of speech.

It should be understood that an audio presentation may be provided in synchronism with the visual display to facilitate a full understanding of the movements which are visually displayed.

An object of the present invention is to provide new and novel display apparatus which provides a very clear and accurate representation, preferably on an enlarged scale, of positions of certain parts of rather complex configuration.

Another object of the invention is the provision of indication means for indicating certain spaces between the parts represented on the display means as, for example, illustrating air passages relative to the speech organs.

Still another object of the invention is to provide a display apparatus which may either be operated directly by hand, or which may be remotely controlled.

A further object of the invention is the provision of display apparatus which may be remotely controlled either in a manual manner or automatically.

A still further object of the invention is to provide a display apparatus including novel contour means which is adapted to assume different shapes and to readily move from one configuration to another.

Yet another object of the invention is the provision of a novel method of preparing clear and accurate films of movements of certain parts such as the organs of speech.

Another object is to provide a novel method of producing a display automatically on a display surface in accordance with certain pre-recorded data.

Yet a further object of the invention is to provide a unique method of teaching speech which is faster than prior art methods, which provides a better visual presentation and which results in increased interest and comprehension by the pupil, and further which is adapted to show all movements including transitional stages between sounds to permit the study and teaching of local and partial phenomena in the movements of the organs of speech.

Other objects and many attendant advantages of the invention will become more apparent when considered in connection with the specification and accompanying drawings, wherein:

FIG. 1 is a front view of the support means of the apparatus of the present invention illustrating the display area, a portion of this view being broken away for the sake of illustration;

FIG. 2 is a sectional view taken substantially along line 2—2 of FIG. 1 looking in the direction of the arrows;

FIG. 3 is a front view on an enlarged scale illustrating a portion of the display area and the details of construction of the flexible contour portion, the contour means being partially broken away for illustrative purposes;

FIG. 4 is a sectional view taken substantially along line 4—4 of FIG. 3 looking in the direction of the arrows;

FIG. 5 is a sectional view taken substantially along line 5—5 of FIG. 3 looking in the direction of the arrows;

FIG. 6 is a sectional view taken substantially along line 6—6 of FIG. 1 looking in the direction of the arrows;

FIG. 7 is a perspective view illustrating a first step in a method according to the present invention;

FIG. 8 illustrates a further step in the method shown in FIG. 7;

FIG. 9 illustrates a still further step in the method shown in FIGS. 7 and 8;

FIG. 10 illustrates a step in a method similar to that shown in FIGS. 7–9;

FIG. 11 is a top perspective view illustrating the support means operatively connected with a remote control means, and illustrating a first step in still another method according to the present invention;

FIG. 12 is a sectional view taken vertically through a portion of the remote control means shown in FIG. 11;

FIG. 13 is a view illustrating a detail of the program means in the form of a punched tape employed in the apparatus shown in FIGS. 11 and 12;

Figure 14:
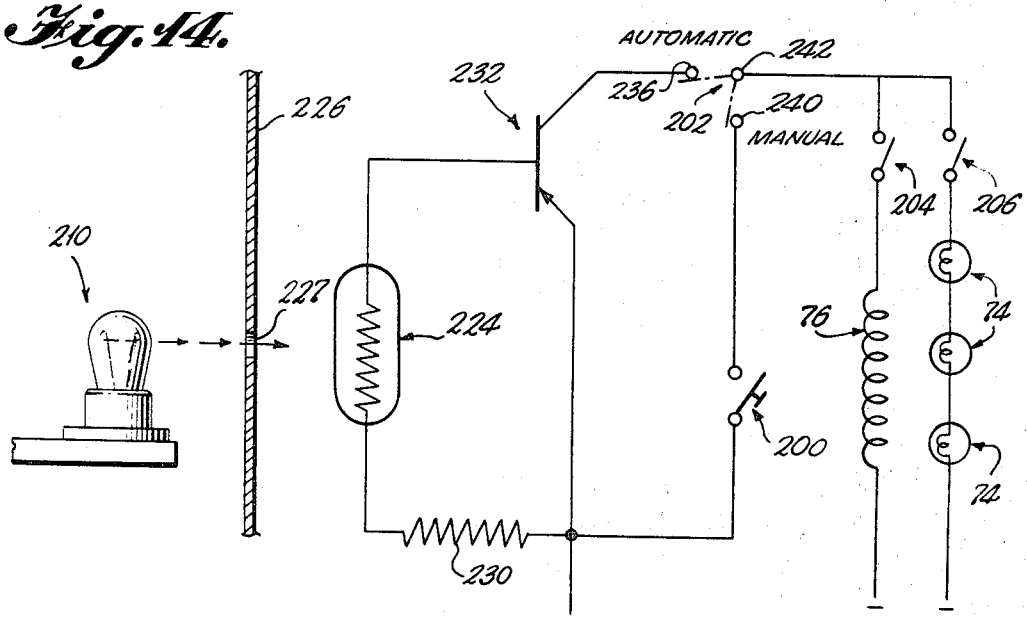
FIG. 14 is a schematic view illustrating a portion of the electrical control network of the apparatus.

Referring now to the drawing wherein like reference characters designate corresponding parts throughout the several views, FIGS. 1 and 2 illustrate certain details of construction of the support means of the present invention. A support means is indicated generally by reference numeral 20 and includes a back wall 22 and a bottom wall 24 which joins with a lower forward wall 26. As seen particularly in FIG. 1, the support means is of generally rectangular configuration and includes a pair of side walls 28 and 30 and a top wall 32 to enclose the components of the apparatus. These walls may be suitably interconnected with one another and are formed of a relatively rigid material. The bottom wall 24 rests upon a base member 36 and is suitably secured thereto, a plurality of leg members 38 extending downwardly from base member 36 to support the apparatus at a suitable elevation. It will be readily apparent that the support means may be mounted in any suitable manner so as to be in proper position for observation by personnel employing the apparatus.

A plate-like member 40 formed of a suitable ferrous metallic material is supported within the frame members 22–32 previously described. Member 40 is provided with a plurality of holes 42 and 44 formed therethrough. It will be noted that as seen in FIG. 1 the holes 42 and 44 are provided throughout the entire area of the plate-like member and in a regular arrangement with respect to one another; that is, the holes 42 and 44 are disposed in alternate relationship with one another, the holes 42 being smaller than the holes 44. The purpose of these holes will be explained hereinafter. The forward surface 46 of member 40 comprises the display surface of the support means. A suitable power source indicated generally with a suitable substance such as fluorescent paint which is adapted to be illuminated by a pair of vertically disposed fluorescent light bulbs 48 at opposite sides of the support means. A suitable power source indicated generally by reference numeral 50 may be provided for illuminating the fluorescent light bulb, this power source being in the form of conventional batteries and the like.

A masking shield means is indicated generally by reference numeral 54 and may comprise a flexible member which as seen particularly in FIG. 2 is adapted to slide through a space provided beneath the member 40 and the associated components. The masking shield is shown in its lowermost position in FIG. 2. This masking shield is adapted to be drawn upwardly through the intermediary of a manually graspable knob 56 into the phantom line position shown in FIG. 2. This masking shield may be employed for covering up the lower portion of the display surface in those instances where it is desired to cut off the view of the lower portion of the display surface.

A light diffusing means in the form of a sheet 60 of suitable material such as plastic or the like which may be translucent is supported adjacent the rearward face of member 40. Member 60 is adapted to diffuse light passing through the holes 44 as hereinafter more fully explained.

A mounting member 64 is supported adjacent the rearward face of member 60, and a backing plate 66 is supported at the rear surface of member 64. Member 64 may be formed of a suitable insulating material such as plastic or the like, and is provided with a first plurality of holes 68 for receiving the illumination means of the apparatus and a second plurality of holes 70 for receiving the electromagnet means of the apparatus.

A conventional electric bulb or lamp 74 is supported within each of said holes 68, and a conventional electromagnet 76 is supported within each of holes 70, each of these electromagnets being of the usual construction and including a solenoid wrapped around an iron core member. It should be understood that the electromagnets are suitably designed so as to produce a strong magnetic field in a restricted area of the member 40, the electromagnets being sufficiently spaced from one another so that the fields thereof will not provide any substantial interference with one another. Suitable electrical leads are connected with bulb 74 and electromagnet 76 for interconnection in an electrical network hereinafter described.

As seen particularly in FIG. 1, a relay center box 80 may be positioned in the upper right-hand portion of the support means, this relay center box being interconnected with the illumination means 74 and the electromagnet means 76 previously described. An electrical cable 82 is interconnected with the relay center box, this cable being adapted to be connected with a remote control means hereinafter described.

As seen in FIG. 1, contour means is illustrated as being supported on the display surface of the support means, this contour means including both rigid portions and flexible portions, although it will be understood that the portions shown as rigid portions in this view could also be formed as flexible portions if so desired. A rigid portion 90 is provided, this portion being formed of a suitable material such as plastic or the like, which may have any suitable color as desired. Member 90 defines the area of the nasal bone and associated boney structure of the head, it being understood that the contour means illustrated in FIG. 1 represents a cross sectional view of the human head taken substantially along the sagittal plane. A plurality of permanent magnets 92 are suitably secured to member 90 as being embedded therewithin and being exposed at the undersurface thereof so that member 90 will be retained in position on the display surface.

Another relatively rigid contour portion is indicated by reference numeral 94 and may be formed of material similar to that of member 90. Member 94 is so configured as to represent the hard palate structure along with the upper teeth. Member 94 is provided with a plurality of permanent magnets 96 at spaced points therein for retaining member 94 in operative position on the display surface. Members 90 and 94 may both be formed of an opaque substance, or may be painted so as to be opaque if desired.

A contour member indicated generally by reference numeral 100 represents the lower jawbone structure, this member having a plurality of permanent magnets 102 disposed therewithin for retaining member 100 in operative position. These permanent magnets may serve as the sole support for the lower jawbone structure and enable it to be moved into any desired adjusted position. As seen in FIG. 6, member 100 is spaced from the display surface 46 to permit other contour portions to be positioned therebeneath as hereinafter described.

Referring again to FIG. 1, the lower jawbone member 100 may include a first portion 114 which is transparent and a second jawbone portion 116 which is opaque. The contour portions disposed beneath the transparent portion 114 may accordingly be readily observed through this transparent portion.

The contour means also includes a further rigid means 120 comprising a pair of spaced plates of similar contour and which represents the hyoid bone structure. Permanent magnets 122 are mounted in means 120 for supporting this contour means in operative position. A further rigid means 124 is disposed between the two spaced plates of the rigid means 120 and represents the epiglottis structure. Rigid means 124 includes an upper spoon portion 124a and a lower petiole portion 124b, each of these portions 124a and 124b being pivotally supported on a pivot pin 126 extending between the two spaced plates of rigid means 120 whereby these two portions 124a and 124b are swingable between said plates. The petiole portion 124b is provided with an elongated narrow arcuate slot 128.

A plurality of flexible contour portions are also provided, and these will now be generally described, the details of construction of these flexible contour portions being hereinafter discussed. It should be understood that the construction of each of these flexible contour portions is similar and that this construction enables the flexible contour portions to be moved into various relatively complex curved configurations.

A flexible contour portion 130 defines the configuration of the upper lip, this contour portion extending from the member 90 into an elongated slot 132 provided on the inner surface of member 94. This permits the upper lip representing contour portion to be extended to the left a considerable distance from the position shown in FIG. 1.

A flexible contour portion 134 represents the lower lip as well as the chin and a portion of the neck, this contour portion extending from the lower edge of the display area into an elongated slot 136 provided on the inner surface of the portion 116 of member 110. This arrangement permits the lower lip representing contour member to be extended to the left as seen in FIG. 1.

A flexible contour portion 140 extends rearwardly from the upper palate representing member 94, member 140 representing the soft palate structure. A flexible contour portion 142 represents the tongue and a forward wall of the pharynx, this member extending from portion 116 of member 100 to the hyoid bone structure 120 and the epiglottis 124.

A flexible contour portion 144 represents the back wall of the pharynx and extends downwardly from the rearmost portion of member 90. Flexible contour portion 146 represents the windpipe or trachea, and a rigid member 148 secured to the upper portion thereof represents the vocal cords. A further flexible contour portion 150 represents a portion of the arytenoid cartilages, and a flexible contour portion 152 has a pin 154 extending from the outer end portion thereof, this pin being adapted to slide within the elongated slot 128 of member 124b previously described.

It is apparent that the rigid and flexible contour portions as discussed above define the general contours of the head of a human being as taken along the sagittal plane. It will be recognized that these members are only intended to indicate primarily the organs of speech as employed during the speaking process, and are not intended to denote any other physiological details. Only sufficient structure of the speech organs is illustrated to enable an understanding of the manner in which the key speech organs are positioned during the utterance of certain sounds.

Referring now to FIGS. 3–5 inclusive, the details of construction of the flexible contour portions may be clearly understood. Each of the flexible contour portions includes a plurality of similar members 160 which may be formed of a suitable material such as plastic or the like. These members as seen especially in FIG. 3 may be formed as cylindrical members cut off along an arcuate surface 162. With this arrangement, the various members 160 are adapted to be nested together as shown so that they can be positioned closely adjacent one another, and at the same time can turn relative to one another so that the contour means can be moved into various curved configurations. It will be noted that the surfaces 162 of one member 160 are generally complementary to the adjacent surface of the member 160 next in line so that the members can readily turn with respect to one another.

All of the various members 160 of a particular flexible contour portion are interconnected with one another by an elongated integral connector member 164 which as seen in FIG. 4 is generally rectangular in cross sectional configuration and which is adapted to fit snugly through a central hole provided in each of members 160. Member 164 is of a suitable flexible material which can be readily flexed and moved into different operative positions, and which will tend to retain its position once it has been adjusted. In a typical example, member 164 may comprise leather.

Each of members 160 is provided with a recess in the undersurface thereof adapted to receive an insert 166. Inserts 166 comprise a body of suitable magnetic material such as iron or the like so as to cooperate with the electromagnets of the support means whereby energization of particular electromagnets will attract the inserts 166 of members 160 of the flexible contour means. In this manner, energization of certain of the electromagnets is adapted to cause movement of the flexible contour portions into different positions as the inserts 166 of the members 160 are attracted to the energized electromagnets.

While the majority of the inserts 166 are simply formed of iron, certain spaced ones of the inserts 166 comprise permanent magnets. It is contemplated that the insert of every fourth one of the members 160 in a particular contour means will comprise a permanent magnet for retaining the flexible contour portions on the display surface when the electromagnets are de-energized. The spacing of the permanent magnets will be chosen so that a minimum thereof will be required for retaining the flexible contour portions in operative position. Any suitable spacing thereof may be provided, and the provision of a permanent magnet in every fourth member is suggestetd solely for the purpose of illustration.

Referring now to FIGS. 7–9 of the drawings, a first method according to the present invention is illustrated. The first step in this method is illustrated in FIG. 7. As seen in this figure, an X-ray movie is made preferably in slow motion of a person while speaking a particular sound, word, or sentence as the case may be. Apparatus is adapted to direct X-rays toward the subject's head as indicated by reference character H, and a camera 172 is disposed at the opposite side of the subject's head so as to obtain an X-ray movie of the subject while speaking. Conventional X-ray movie techniques may be employed for this step. While the subject is speaking, the sounds are picked up by a microphone 174 which is connected by means of an electric cable 176 to a suitable recording mechanism such as a tape recorder or the like.

Turning now to FIG. 8 of the drawings, the next step in the method is illustrated. In this step, the X-ray film which was obtained as illustrated in FIG. 8 is projected from a projector 178 onto the display surface of the support means 20 previously described. When the image is so projectetd, a person can then place the contour means in the proper position according to the image projected on the display surface. The X-ray film is projected one frame at a time, and when a single frame is projected on the display surface, the contour means is positioned to overlie the corresponding portions of the image as projected on the surface.

Turning now to FIG. 9 of the drawings, the next step of the method is illustrated. As shown in this figure, the contour means has been properly positioned on the display surface, and a movie camera 180 is employed for taking a picture of the contour means in this particular configuration. Accordingly, the camera 180 records a single frame of the X-ray film as reproduced by the contour means. This is desirable since the contour means may be on a considerably enlarged scale as compared to the actual organs of speech, and in a typical example the enlargement may be on the order of five (5) times. In this manner, a finished movie may be obtained by the use of camera 180 which of course may be in color if so desired and which will clearly illustratet the movements of the various organs of speech when uttering a particular sound. As illustrated herein, the various organs of speech are illustrated in approximately the position they will occupy when uttering the vowel $i$ as in "eat."

As illustrated in this particular method, the contours are defined on the display surface by the rigid and flexible contour portions previously described. It should be understood that the desired outlines may also be obtained by energizing certain of the lamps of the illumination means, and a finished movie may also be obtained in this manner. Additionally, both the rigid and flexible contour portions as well as the illumination means may be employed to provide a combined effect. As illustrated, the flexible and rigid contour portions are placed manually into the desired positions, but as will be apparent hereinafter, the remote control means may be employed for actuating the contour portions into the desired relationship. Additionally, the electromagnets and illuminating lamps may be energized from a remote position either manually or automatically as hereinafter described.

Referring now to FIG. 10, a modification of the method shown in FIGS. 7–9 is illustrated. This modified step may replace the step shown in FIG. 8 of the drawings. In FIG. 8, the X-ray image is projected directly on the display surface and the indication means are adjusted in accordance with the image on the entire display surface. As seen in FIG. 10, a modified form of support means 20' is illustrated which is similar in all respects to the previously described support means with the exception that a first grid means 184 is provided over the portion of the support means including the electromagnets and the lamps, while a second grid means 186 is provided adjacent thereto. In this arrangement, the image from the projector 178 may be projected on the smaller grid portion 186, and then the indication means may be adjusted in the larger grid area 184 to correspond to the image projected on the smaller grid area 186. The method is in other respects the same as that shown in FIGS. 7–9.

Referring now to FIGS. 11–13, additional structural details are illustrated and a further method of the invention is shown. A remote control means is indicated generally by reference numeral 190 and comprises a body means 192 defining a control panel portion 194, the body means being mounted preferably on rollers 196 so that it may be moved from place to place as required.

A plurality of manually operable switches 200 are provided in the control panel portion 194, and three control switches 202, 204 and 206 are also provided, the purpose of these switches being hereinafter explained.

A source of light is indicated generally by reference numeral 210 and may comprise any suitable construction such as an adjustable neon lamp or the like. This source of light is suitably mounted at the upper portion of the body means 192 and is adapted to be adjusted into the position shown in FIGS. 11 and 12 for directing light toward a transparent sheet of material 214 mounted in the upper portion of the body means 192.

As seen particularly in FIG. 12, a support member 220 suitably mounted upon angle members 222 connected with body means 192. Support member 220 is adapted to support a plurality of closely spaced light sensitive mechanisms such as photosensitive resistors 224 in the form of conventional photocells. Each of these photosensitive resistor means is connected through a suitable electrical interconnection provided through the intermediary of cable 82 previously described with the lamps and electromagnets of the support means described in connection with FIGS. 1–6.

Figure 15:
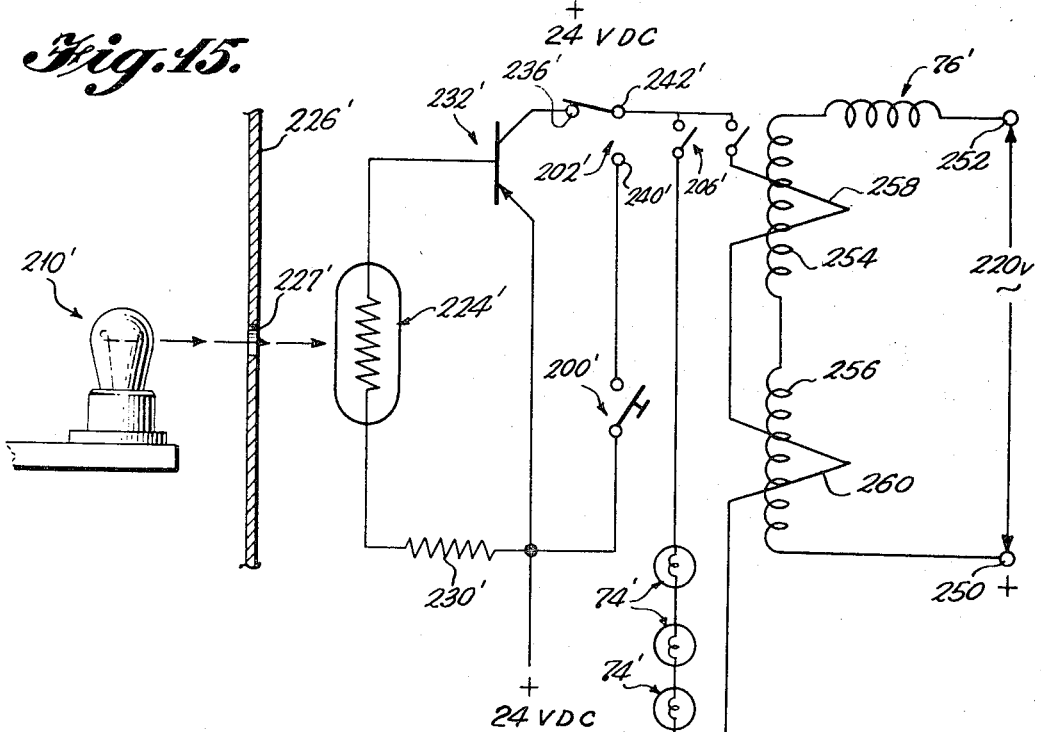
FIG. 15 is a view similar to FIG. 14 illustrating a modified form of electrical network.

Turning now to FIGS. 14 and 15, the electrical interconnection may be more clearly understood. As seen in FIG. 14, reference numeral 210 represents schematically a suitable source of light which directs light toward one of the photosensitive resistors 224. A suitable program means such as a punched card or a punched tape 226 is provided, this program means being disposed between the source of light and the photosensitive resistors as may be seen most clearly in FIG. 12. Any suitable means may be provided for moving the program means relative to these components for adjusting the indication means.

As seen in FIG. 14, photosensitive resistor 224 is connected through a resistor 230 with the positive side of a source of electrical current indicated as providing a DC voltage of 24 volts. The other side of the photosensitive resistor 224 is connected with the base of a conventional transistor 232. The positive side of the source of electricity is connected with the emitter of transistor 232, and the collector of transistor 232 is connected to one contact 236 of switch 202 which was previously described. The positive side of the current source is also connected through one of the manually operable switches 200 with the contact 240 of switch 202.

The contact 242 of switch 202 is in turn connected through the switch 204 with the coil of one of the electromagnets 76 previously described which in turn is connected with the negative side of the source of electricity. Contact 242 of switch 202 is also connected through the switch 206 previously described with one or more of the lamps 74 described in connection with the support means shown in FIGS. 1–6.

With the arrangement shown in FIG. 14, the circuit may be adjusted so that when no light falls on photosensitive resistor 224, the transistor 232 is biased to cut off. As the resistance of the photosensitive resistor 224 changes when light passes through a hole 227 of program means 226, the base bias is changed causing the transistor to conduct. When switch 202 is moved into the upper phantom line position as shown in FIG. 14, this will cause current to flow to the upper contacts of switches 204 and 206. If switch 204 is closed, current will then flow to the coil of one of the electromagnets 76 causing this electromagnet to be energized. If the switch 206 is closed, current will flow to one of the lamps 74 causing the lamp to be lit.

It should be understood that the circuit shown in FIG. 14 is interconnected with one photosensitive resistor and with one of the electromagnets of the support means. It may also be connected with either a single lamp or a plurality of lamps disposed adjacent one another. Accordingly, the program means 226 may have holes formed therein so as to allow light to impinge on only certain ones of the photosensitive resistors 224 so that only certain ones of the electromagnets and/or the lamps 74 may be energized as desired. Of course, a plurality of lamps may be interconnected as mentioned previously.

It is accordingly clear that by actuating switches 204 and 206, energization and actuation of the electromagnets or the lamps may be controlled so that they can be operated independently of one another or simultaneously.

It should also be noted that switch 202 may be moved into the lower phantom line position as seen in FIG. 14 so that the electromagnets or the lamps can be adjusted manually by operation of the manual switches 200.

It will be apparent that the program means may be programmed so as to have holes therein in appropriate locations for positioning the contour means in the proper position as desired, or for illuminating certain of the lamps as desired. This programming can of course be carried out in accordance with the known desired positions of the indication means as obtained by X-ray films or the like.

It should also be noted that the lamps employed as the illumination means may be of different colors for illuminating different portions of the display area. Different ones of the lamps may also be suitably interconnected with one another for producing the desired effect, it being noted that the diffuser means 60 will tend to diffuse the light passing through the holes 44 adjacent to the various lamps.

Turning again to FIGS. 11–13, a pair of roller members 246 may be suitably rotatably mounted at opposite sides of the remote control apparatus and are adapted to receive a punched tape 226 which passes between the transparent portion 214 and the array of photosensitive resistors 224. As seen especially in FIG. 13, the punched tape 226 may have a plurality of holes 226' formed therethrough. Light is adapted to pass through thesse holes and to impinge upon certain ones of the photosensitive resistors so as to actuate corresponding electromagnets and/or lamps of the support means so as to automatically cause the indication means to be properly adjusted. In the case of the contour means, energization of the electromagnets will cause the flexible contour means members to be attracted to certain ones of the electromagnets, thereby properly positioning the contour means. In the case of the illumination means, the proper lamps will be lit, all of this being accomplished in an automatic manner, although the same results may of course be obtained by operating the manually operable switches 200 if so desired.

Referring now to FIG. 15 of the drawings, a modification of the electrical network shown in FIG. 14 is illustrated. Similar components have been given the same reference numerals primed in this figure. It will be noted that the lamps 74' are operated in the same manner as in the previous embodiment. However, in this form of the invention it is desired to operate the electromagnets with a higher voltage, and accordingly the coils of the electromagnets are adapted in this modification to receive 220 volts across the source of supply existing between contacts 250 and 252. The windings of a transformer are indicated by reference numerals 254 and 256, and the saturation windings of the saturation transformer are indicated by reference numerals 258 and 260, these windings being connected with a DC source of electrical energy. It will be understood that this saturation transformer operates in a conventional manner such that current will not flow to the coils of electromagnets 76' until current flows through the saturation windings whereupon the full 220 volt current will pass through the electromagnet coil. With this particular circuit, a much larger voltage is applied to the coils of the electromagnets so as to provide a greater magnetic force.

Figure 16:
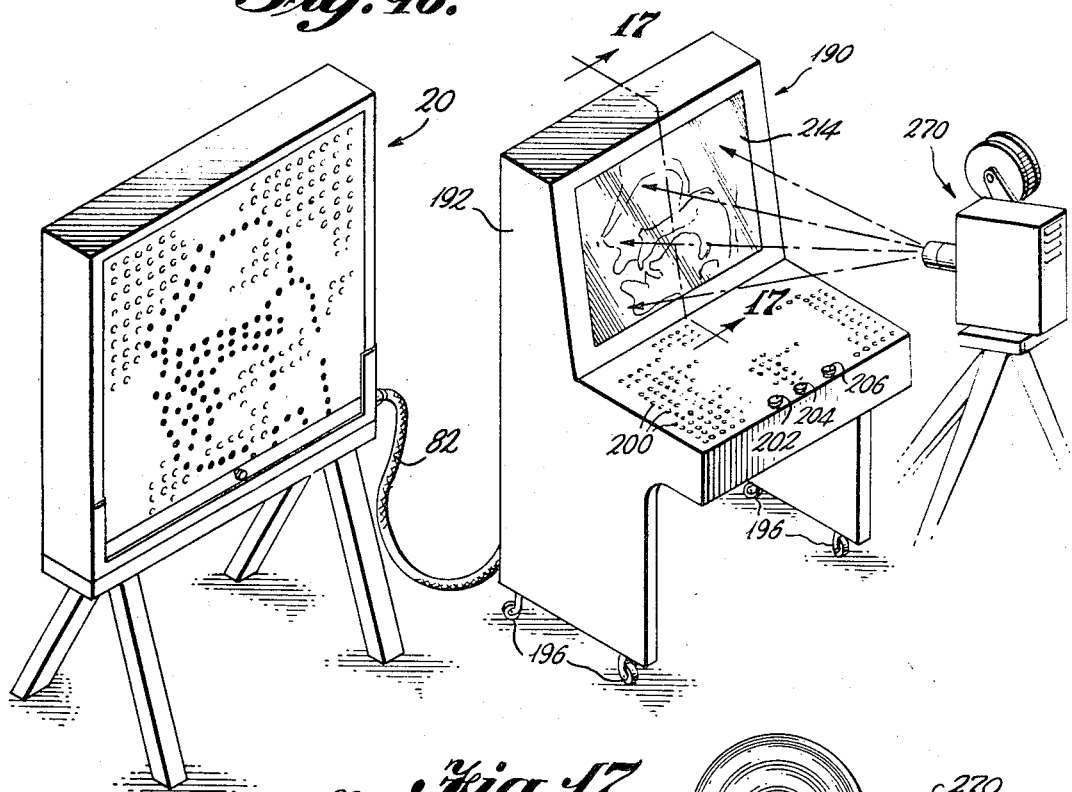
FIG. 16 is a top perspective view illustrating the components similar to those shown in FIG. 11 and showing a still further method according to the present invention.
Figure 17:
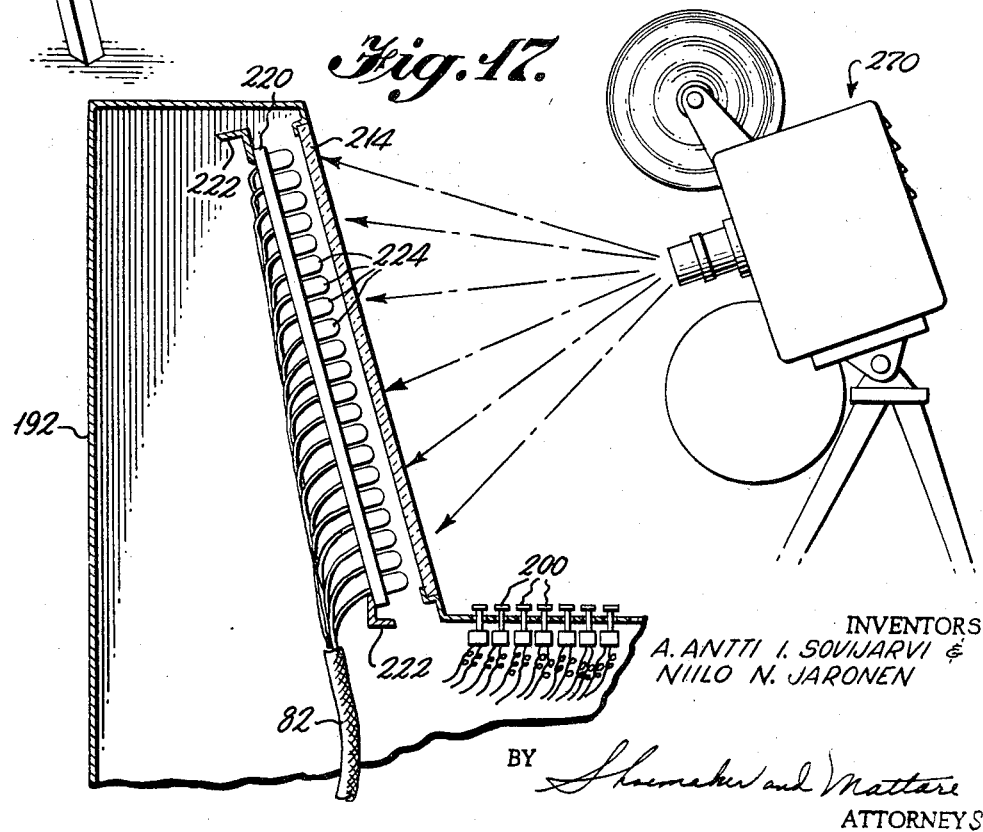
FIG. 17 is a view taken substantially along line 17—17 of FIG. 16 looking in the direction of the arrows.

Referring now to FIGS. 16 and 17, a still further method according to the present invention is illustrated. In carrying out this method, a projector 270 is provided, and the X-ray film as obtained according to FIG. 7 is projected through the transparent portion 214 directly onto the array of photosensitive resistors 224 provided in the remote control means. It will be noted that the remote control means as illustrated in FIGS. 16 and 17 is identical with that shown in FIGS. 11 and 12 with the exception that the light means 210 and the rolls 246 have been removed from the remote control means as they are not required in carrying out this particular method.

It is apparent that the photosensitive resistors may be so adjusted that certain portions of the projected image from the projector 270 are adapted to actuate the circuits as shown either in FIGS. 14 and 15 for adjusting the indication means on the support means 20. It will be understood that certain portions of the projected image from the X-ray film will be brighter than other portions so as to thereby suitably actuate the photosensitive resistors. As shown in FIG. 16, the switch 206 is closed while switch 204 is open, and the switch 202 is in the position for automatic operation. With this arrangement, the electromagnets will not be energized at the support means but the lamps will be energized in accordance with the amount of light falling on the photosensitive resistors. Accordingly, certain lamps are lit so as to provide the desired outlines on the display surface.

It is apparent that the apparatus of the present invention is adapted to be employed in many different manners, and that the recorded sounds as obtained by the audio recorder in the step illustrated in FIG. 7 may be suitably synchronized with the display provided in each of the various methods as described above.

It is apparent from the foregoing that there is provided according to the present invention new and novel display apparatus which provides a very clear and accurate representation, preferably on an enlarged scale of the positions of certain parts of rather complex configuration, and which is particularly adapted for illustrating the organs of speech while in the process of speaking. The arrangement is such that the indication means cannot only show the outlines of certain organs of speech, but may also indicate the presence of air passages between certain organs as by illuminating certain lamps as required. The display apparatus may be operated so that the indication means thereof is either remotely operated or the contour means may be manually positioned by directing grasping the contour means. Additionally, the remote control of the adjustment of the indication means may be carried out either by operating the manual operable switches or it may be carried out in an automatic manner according to different procedures as discussed hereinbefore. The flexible contour means of the present inventon is of a unique construction to enable it to be positioned into different shapes and configurations and to further move with facility from one operative position to another position.

The present invention provides a first method of preparing clear and accurate films, which may be in color, of movements of the organs of speech, such movements being indicated either by outlines of the physical members such as the contour means, or by illuminating certain portions of the display area, or by a combination of both means of indication. A further method is provided for automatically producing a display on the display surface in accordance with pre-recorded data as obtained by first making an X-ray film, and then transferring the desired information to suitable program means such as a punched card or a punched tape. The methods of the present invention enable teaching of speech to be carried out more quickly, with a better visual presentation and further serves to stimulate interest and increased comprehension by the pupil. This method of teaching speech is adapted to show all of the movements of the organs of speech including transitional stages between sounds and enables one to study and teach local and partial phenomena in the movements of the organs of speech.

As this invention may be embodied in several forms without departing from the spirit or essential characteristics thereof, the present embodiment is herefore illustrative and not restrictive, and since the scope of the invention is defined by the appended claims, all changes that fall within the metes and bounds of the claims or that form their functional as well as conjointly cooperative equivalents are therefore intended to be embraced by those claims.

What we claim is:

1. Display apparatus comprising support means defining a display surface, indication means supported by said support means adjacent said display surface, said indication means being adjustable to define outlines representing objects of relatively complex configuration, said display surface having a plurality of spaced holes formed therethrough, illumination means supported by said support means and being disposed adjacent said holes, and means for diffusing light from said illumination means, said diffusing means being positioned between said illumination means and said display surface for diffusing light passing through the holes in said display surface.

2. Display apparatus comprising support means defining a display surface, indication means supported by said support means adjacent said display surface, said indication means being adjustable to define outlines representing objects of relatively complex configuration, said indication means comprising contour means, said contour means including flexible portions which may be flexed into relatively complex configurations, and retaining means for retaining said contour means in a desired position on said display surface, said display surface being formed of a metallic substance, said retaining means comprising permanent magnet means operatively associated with said contour means and adapted to be magnetically attracted to said metallic display surface, said contour means also having operatively associated therewith spaced metallic portions, and electromagnet means supported by said support means adjacent said display surface for attracting said metallic portions of the contour means whereby energization of said electromagnet means is adapted to control the position of said contour means.

3. Display apparatus comprising support means defining a display surface, indication means supported by said support means adjacent said display surface, said indication means being adjustable to define outlines representing objects of relatively complex configuration, said indication means comprising contour means, said contour means including flexible portions which may be flexed into relatively complex configurations, and retaining means for retaining said contour means in a desired position on said display surface, said contour means comprising a plurality of similar members, a flexible connector engaging the members of said contour means to interconnect said members, said members having generally complementary arcuate surfaces facing one another so as to permit the members to be positioned relatively close to one another and at the same time permitting relative movement with respect to one another so that the contour means can be positioned in curved configurations, spaced ones of said members having permanent magnets supported therein for retaining the contour means on said display surface, said display surface comprising a metallic substance, other spaced ones of said members having metallic means supported thereby, and electromagnet means supported by said support means adjacent said display surface for controlling the position of said contour means.

4. Display apparatus comprising support means defining a display surface, indication means supported by said support means adjacent said display surface, said indication means being adjustable to define outlines representing objects of relatively complex configuration, said support means including a generally planar member having one surface thereof forming said display surface, said planar member having a plurality of holes formed therethrough, said indicating means comprising a plurality of illumination means disposed adjacent said holes at one side of said planar member so that light from said illumination means may shine through said holes, said planar member being formed of a metallic substance, said indication means also including contour means, said contour means including flexible portions, and retaining means for retaining said contour means in operative position on said display surface.

5. Apparatus as defined in claim 4 wherein said illumination means comprises a plurality of separate lamps, and light diffusing means disposed between said lamps and said planar member whereby light from said lamps is diffused prior to passing through the holes in said planar member.

6. Apparatus as defined in claim 4 wherein said contour means flexible portions are formed of a plurality of members, connector means operatively connected with each of said members, said connector means being flexible, said contour members being disposed closely adjacent one another and including generally complementary arcuate facing surfaces permitting ready turning movement of one contour member with respect to an adjacent contour member whereby the contour means may be positioned into curved configurations, some of said contour members having permanent magnets supported thereby, and some of said contour members including metallic means supported thereby, and electromagnet means supported by said support means adjacent said display surface for controlling the operative position of said contour means.

7. Display apparatus comprising support means defining a display surface, indication means supported by said support means adjacent said display surface, said indication means being adjustable to define outlines representing objects of relatively complex configuration, said indication means being operatively connected with an electrical network for adjusting said indication means, remote control means spaced from said support means and said remote control means including portions of said electrical network, said electrical network including a plurality of photosensitive resistors afforded by said remote control means, said resistors being connected in said electrical network for automatically adjusting said indication means in accordance with the amount of light falling on said photosensitive resistor means.

8. Apparatus as defined in claim 7 including means for supporting program means adjacent said photosensitive resistors, said program means controlling the amount of light falling on said photosensitive resistors, and a light source for directing light toward said program means and said photosensitive resistors with said program means being interposed between said light source and said photosensitive resistors.

9. A display method comprising providing support means including a display surface and providing indication means adjacent said display surface for providing visible indication of certain contours, and then forming certain contours at said display surface by adjusting said indication means, and including the additional steps of first making an X ray film of a human being while speaking so as to record the position of the internal speech organs while so speaking, then projecting an image from said X ray film, whereupon said certain contours are formed to correspond to the contours projected from said film.

10. The method as defined in claim 9 wherein said contours are formed by transmitting light through certain portions of said display surface.

11. The method as defined in claim 9 wherein said contours are formed by providing a flexible contour means supported on said display surface, and deforming and positioning said flexible contour means as necessary to correspond to the image projected from said film.

12. The method as defined in claim 9 wherein the contours are formed by transmitting light through certain spaced portions of said display surface and by providing a contour means having flexible portions and deforming and positioning said flexible portions as necessary to correspond to the image projected from said film.

13. A display method comprising providing support means including a display surface and providing indication means adjacent said display surface for providing visible indication of certain contours, and then forming certain contours at said display surface by adjusting said indication means, and including the steps of providing a remote control means having photosensitive resistor means, providing control means for said indication means at said support means and being operable by said photosensitive resistor means, providing program means for controlling the amount of light falling on said photosensitive resistors, directing light toward said photosensitive resistors with said program means interposed between the source of light and the photosensitive resistors, whereby said program means is adapted to automatically control the adjustment of said indication means.

14. A display method comprising providing support means including a display surface and providing indication means adjacent said display surface for providing visible indication of certain contours, and then forming certain contours at said display surface by adjusting said indication means, and including the steps of providing a remote control means having photosensitive resistor means, providing control means for said indication means at said support means and being operable by said photosensitive resistor means, and projecting an image on said photosensitive resistor means to automatically operate said indication means at the support means.

References Cited

UNITED STATES PATENTS

| 1,850,899 | 3/1932 | Smith | 35—17 |
| 3,019,425 | 1/1962 | Romero. | |
| 3,128,458 | 4/1964 | Romero. | |
| 3,197,890 | 8/1965 | Lorenz | 35—17 X |

FOREIGN PATENTS 842,480  7/1960  Great Britain.

EUGENE R. CAPOZIO, *Primary Examiner.*

H. S. SKOGQUIST, *Assistant Examiner.*

UNITED STATES PATENT OFFICE
CERTIFICATE OF CORRECTION

Patent No. 3,410,003　　　　　　　　　　November 12, 1968

Arvi Antti I. Sovijarvi et al.

It is certified that error appears in the above identified patent and that said Letters Patent are hereby corrected as shown below:

Column 4, line 57, "support means. A suitable power source indicated gen-" should read -- support means. This forward surface 46 may be painted --; line 63, "bulb" should read -- bulbs --.

Signed and sealed this 7th day of October 1969.

(SEAL)
Attest:

Edward M. Fletcher, Jr.　　　　　　　　WILLIAM E. SCHUYLER, JR.
Attesting Officer　　　　　　　　　　　　Commissioner of Patents